United States Patent [19]
Anand

[11] Patent Number: 5,966,948
[45] Date of Patent: Oct. 19, 1999

[54] SUB-AMBIENT ABSORBER GAX CYCLE

[75] Inventor: Gopalakrishnan Anand, Baltimore, Md.

[73] Assignee: Energy Concepts Co., Annapolis, Md.

[21] Appl. No.: 09/047,258

[22] Filed: Mar. 24, 1998

[51] Int. Cl.$^6$ .................................................. F25B 15/00
[52] U.S. Cl. ................................. 62/101; 62/485; 62/489
[58] Field of Search ........................... 62/101, 476, 485, 62/489

[56] References Cited

U.S. PATENT DOCUMENTS

| | | | |
|---|---|---|---|
| 3,483,710 | 12/1969 | Bearint | 62/476 |
| 3,641,784 | 2/1972 | Schlichtig | 62/476 |
| 4,542,628 | 9/1985 | Sarkisian et al. | 62/335 |
| 4,827,728 | 5/1989 | DeVault et al. | 62/79 |
| 4,921,515 | 5/1990 | Dao | 62/335 |
| 5,097,676 | 3/1992 | Erickson | 62/476 |

*Primary Examiner*—William Doerrler

[57] ABSTRACT

Apparatus and process are disclosed for increasing the efficiency of thermally actuated absorption process such as absorption compression and absorption heat pumping. The improvement allows greater temperature overlap between generator and absorber, ambient responsive performance, significantly lower need for rectification, multiple temperature level refrigeration, and hybrid operation. Referring to FIG. 2, the useful result is obtained by routing the sorbent from the externally cooled absorber (10) to a sub-ambient absorber (2) and further cooling and diluting the sorbent by means of the evaporator (28). The sorbent is concentrated in the absorber-heated generators (14 and 18) and the externally heated generator (22).

11 Claims, 8 Drawing Sheets

SUB-AMBIENT ABSORBER GAX CYCLE

Some current applications in refrigeration, air conditioning, and heat pumping have additional requirements which are not directly and economically met by the basic GAX cycle. These include the need for refrigeration at multiple temperature levels, use of low temperature heat, and hybrid operation with both prime fuel (or waste heat) and electrical (or mechanical) power.

One means of overcoming some of the shortcomings of the basic GAX cycle is described in U.S. Pat. No. 5,097,676 "Vapor Exchange Duplex GAX Absorption Cycle". FIG. 1 of that patent discloses the addition of a VX absorber-desorber component to an absorption cycle apparatus. The absorbent from the ambient cooled absorber at suction (LP evaporator) pressure is pressurized; split it into at least two streams; one stream is desorbed in a vapor exchange (VX) generator; the other stream is cooled in a VX absorber; and the vapor (sorbate) from the VX generator is transferred to the VX absorber to produce a super-dilute sorbent which has absorbed more sorbate than is possible to absorb at suction pressure and at the temperature of the externally cooled absorber. The super-dilute sorbent is pressurized and routed to the delivery pressure generator. This causes the GAX temperature overlap to increase. Up to one third of the heat which would otherwise be wastefully rejected from the externally cooled absorber can be usefully delivered to the GAX desorber. With volatile absorption working pairs, the need for rectification is eliminated or reduced, because the refrigerant vapor exiting the delivery pressure generator is substantially purer than that from a conventional generator. A small benefit is obtained from the lower heat of desorption characteristic of more dilute absorbents—less heat is necessary to yield a given amount of refrigerant. Also, since the super-dilute absorbent generator operates at a colder temperature than the conventional generator, it can utilize low temperature external heat which would otherwise be wasted, for example in flame-fired units it can further cool the exhaust gas.

The Vapor Exchange Duplex GAX absorption cycle requires a second GAX heat exchange between part of the absorber at suction pressure and the VX desorber at the intermediate pressure. That transfer of heat has proven to be difficult for volatile sorbents with countercurrent heat and mass transfer, owing to the "gravity mismatch": the desorber with falling liquid sorbent is hottest at the bottom, whereas the absorber with falling liquid sorbent is hottest at the top. Countercurrent vapor-liquid contact in the absorber (and hence falling film) is desirable because that yields the greatest temperature overlap. Larger temperature overlap makes possible more internal transfer of heat, thus increasing cycle Coefficient of Performance. Countercurrent operation in the desorber is desirable as it reduces or eliminates subsequent rectification needs. The rectification needs, though lower than in the basic GAX cycle, could still be significant.

Thus, one objective of this invention is to provide a practical absorption vapor compression cycle having a high COP at all lifts including higher than ideal double-effect lift.

Another object of this invention is to extend the GAX overlap of a GAX absorption vapor compression cycle without imposing heat and mass transfer complexity of an additional GAX desorber at intermediate pressure.

Another object is to reduce the rectification required in an absorption compression cycle which uses a volatile sorbent.

Further objectives of this invention are to define enabling structure which permits increased heat match in the GAX absorber and GAX generator; which permits ambient-responsive performance; which permits hybrid operation; and which accommodates multiple evaporator temperatures.

DISCLOSURE OF INVENTION

The above and other useful objects are obtained by providing apparatus and corresponding process for at least one of compressing a vapor and providing heating and/or cooling/refrigeration, by absorbing a vapor from a first evaporator into at least two absorbers at a first pressure; wherein the lowest temperature absorber is in heat exchange relationship with a second evaporator and the second absorber is externally cooled; wherein vapor from at least one of the evaporators is absorbed in at least one GAX absorber; wherein the vapor is desorbed from at least two desorbers at a second pressure which is higher than the first pressure; and wherein at least one of the desorbers is in heat exchange relationship with the GAX absorber(s). The lowest temperature absorber and the second evaporator operate at sub-ambient temperatures—temperatures lower than the minimum temperature of the externally cooled absorber.

This advanced GAX cycle, having a sub-ambient absorber, is termed the Sub-Ambient Absorber (SAA) GAX cycle. It can use either volatile or non volatile absorbents. With volatile absorbents, it is desirable to avoid large mixing losses, which arise when two fluid streams of different temperature and/or different equilibrium concentration are contacted. Those losses may be minimized by: conducting generator heating and absorber cooling countercurrently; conducting mass exchange in at least one component of the GAX exchanger countercurrently; or conducting crossflow mass exchange in the individual components using multiple locally cocurrent contacts as disclosed in U.S. Pat. No. 5,660,049 "Sorber With Multiple Cocurrent Pressure Equalized Upflows".

There are two primary embodiments of this invention depending upon whether the vapor from the second evaporator is absorption compressed to condensation pressure i.e. the pressure at which the refrigerant vapor condenses while rejecting heat to external cooling; or is mechanically compressed. In the absorption compression embodiment, an intermediate pressure absorber is provided in which the vapor from the second evaporator is absorbed and the absorbent is pressurized to condensation pressure and desorbed.

In the mechanical compression embodiment the vapor from the second evaporator is mechanically compressed to condensation pressure. Since this embodiment combines both absorption and mechanical compression, it is also referred to as the hybrid embodiment. There are two major variants of this embodiment—the integrated variant, wherein the mechanical compressor loop uses the same refrigerant and condenser as the absorption loop; and the hermetic variant, wherein the mechanical compressor plus associated second evaporator, condenser, and refrigerant are hermetically separate from the absorption loop.

BRIEF DESCRIPTION OF THE DRAWINGS

FIGS. 1–10 jointly illustrate the absorption embodiment of this invention wherein the vapor generated in the sub-ambient (second) evaporator is absorbed in the solution at an intermediate pressure, and desorbed at delivery pressure.

BEST MODE FOR CARRYING OUT THE INVENTION

Figure 1:
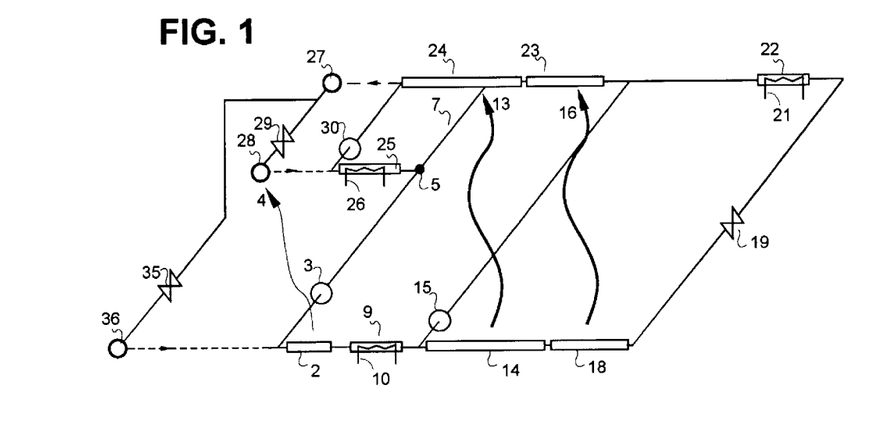
FIG. 1 is the thermodynamic state point diagram (pressure, temperature, and concentration)

Referring to FIG. 1, sorbent liquid in absorber 9 is cooled by external cooling 10 while absorbing suction pressure sorbate from evaporator 36, and is further cooled and sorbed in the sub-ambient absorber 2. The resulting partially super-diluted sorbent is then increased in pressure by pump 3, and divided into at least two streams by splitter 5. One stream is routed to a third pressure level (3P) absorber 25 which is cooled by source of cooling 26. The other stream is routed to the generator 24. The split makes it possible to achieve maximum sorbent dilution in 3P absorber 25. Vapor generated in the sub-ambient evaporator 28 is transferred to and absorbed in the 3P absorber, thereby further diluting the sorbent.

The resulting super-dilute sorbent from the 3P absorber is increased to delivery pressure by pump 30 and then supplied to generator 24, preferably to the vapor exit end of a countercurrent exchanger 24. When there is temperature overlap between absorber 18 and generator 23, internal GAX heat transfer 16 is incorporated between those two components. Sub-ambient cooling and superdilution of the sorbent results in increased temperature overlap between the absorber 14 and the generator 24, and internal heat transfer 13 is incorporated between those two units. The partly warmed, partly desorbed (concentrated) sorbent from the generator 24 is supplied to the generator 23. The hot, partly desorbed sorbent from the generator 23 is supplied to the externally heated generator 22, heated by heat source 21. The fully desorbed (concentrated) sorbent is then letdown in pressure to suction pressure by means for pressure reduction 19, and routed to GAX absorber 18, which preferably incorporates countercurrent vapor-liquid contact. The partly cooled, partly diluted sorbent from absorber 18, is supplied to absorber 14, which is cooled by and supplies heat to the GAX desorber 24. The sorbent is then supplied back to the externally cooled absorber 9.

Delivery pressure vapor from generators 24, 23, and 22 is supplied to condenser 27. The condensed refrigerant liquid is then letdown in pressure and supplied to the evaporation heat exchanger 28 by means for pressure reduction 29 and to the evaporator 36 by means for pressure reduction 35.

Preferably at least part of the sorbent effluent from the GAX absorber 14 is increased in pressure to delivery pressure by means for increasing pressure 15, and then supplied to one of generators 23 and 22. This makes it possible to match the heat duties of GAX generators 24 and 23 and GAX absorbers 14 and 18 over the full temperature overlap range.

The FIG. 1 thermodynamic diagram incorporates the usual conventions that horizontal lines represent constant pressures, vertical lines represent constant temperatures, diagonal lines represent constant concentrations, solid lines represent liquid flows, dashed lines represent vapor flows, and wavy lines represent heat flows. In addition, heavy solid horizontal lines represent GAX components.

Figure 2:
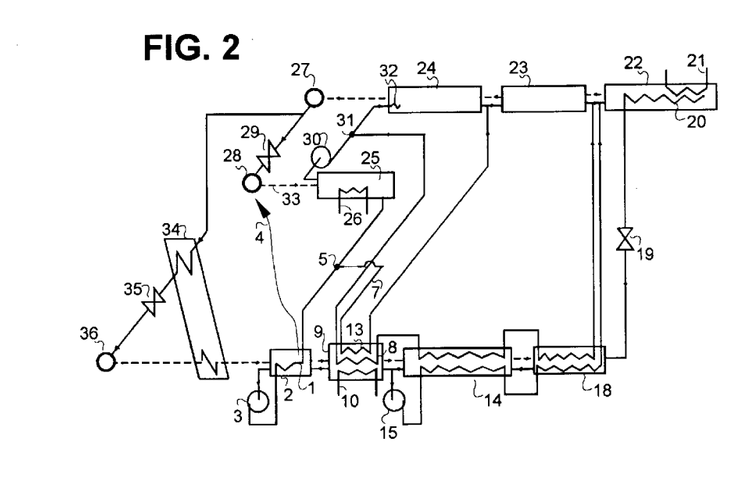
FIG. 2 is a simplified block diagram of the same cycle.

Referring to FIG. 2, the same cycle as FIG. 1 is depicted in simplified block diagram from whereby the various external and internal heat exchanges are explicitly represented. Like-numbered components have the same description as in FIG. 1. The newly-represented components in FIG. 2 include: vapor transfer line 33 between sub-ambient evaporator 28 and 3P absorber 25; GHX (generator heat exchange) sensible heat exchanger 20 which cools the effluent sorbent from externally heated generator 22 while causing additional desorption in generator 22; AHX (absorber heat exchange) sensible heat exchanger 1 which heats the effluent sorbent from the evaporation heat exchanger 2 while providing additional cooling to that exchanger; AHX exchanger 13 which further heats part of the effluent sorbent from the evaporation heat exchanger; AHX exchanger 8 which heats part of the effluent sorbent from the 3P absorber 25; refrigerant subcooler 34; SCR (solution cooled rectifier) 32 which cools and rectifies the delivery pressure vapor while providing sensible heat to part of the super-dilute sorbent.

Figure 3:
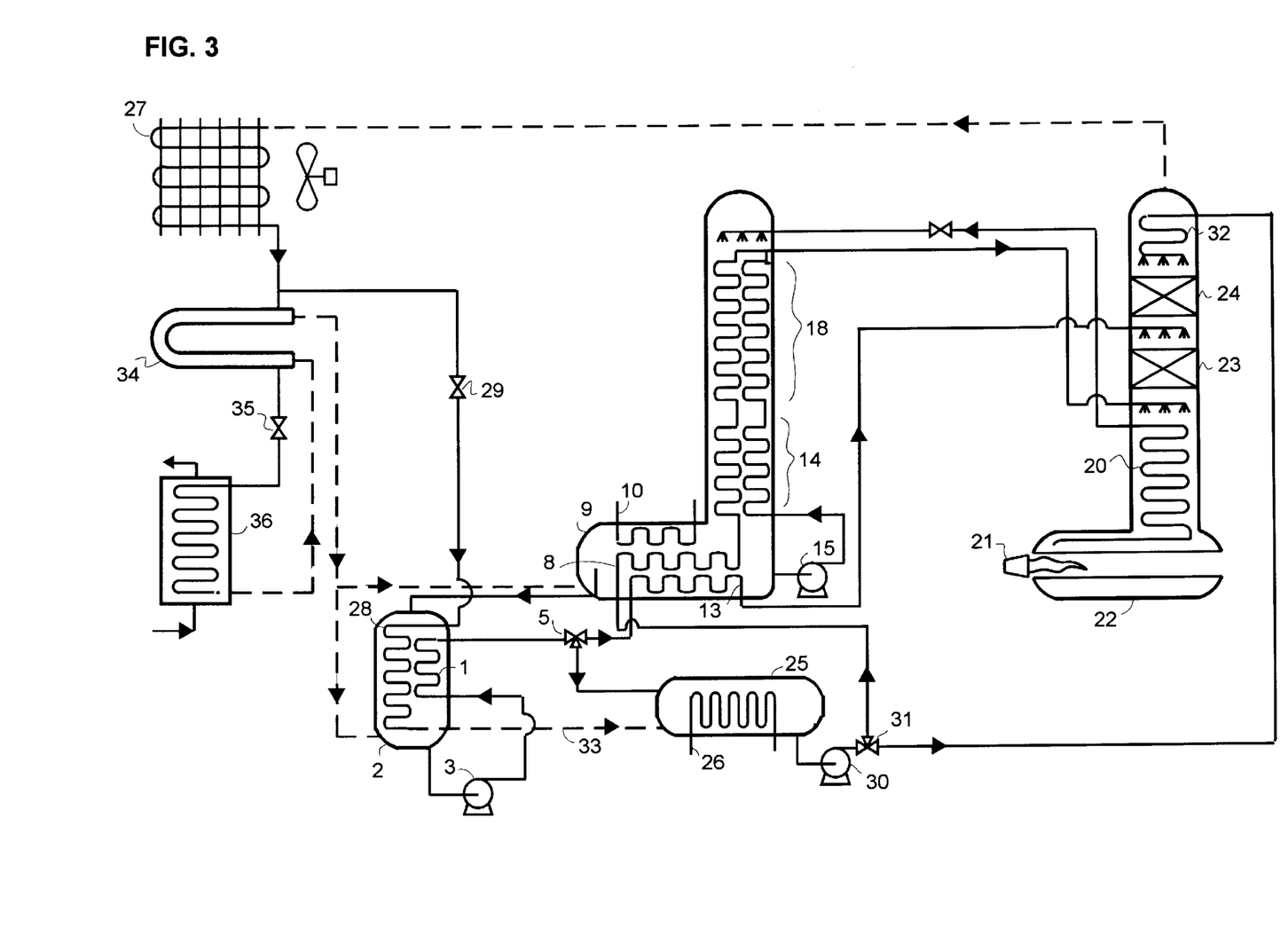
FIG. 3 is a simplified flowsheet of the same cycle.

Referring to FIG. 3, the same cycle is depicted as appears in FIGS. 1 and 2, in simplified schematic flowsheet form. Like numbered components have the same description as in FIGS. 1 and 2. The various heat/mass exchange devices 14, 18, 20, 23, 24, 32 are arbitrarily depicted as vertical falling film types, since they will frequently be the preferred choice. Note that the three sequential suction pressure absorptions (9, 14, 18) are all located in a single vessel, and similarly the desorption processes 22, 20, 23, 24 are located in a single vessel.

It will be apparent to the artisan that the several heat and mass exchanges depicted in FIG. 3 can be accomplished equivalently in other physical configurations. For example, the three sequential suction pressure absorptions (9, 14, 18) can be located in three separate vessels vice a single vessel, and similarly for desorption processes 22, 20, 23, 24. The means of internal heat transfer 4, 13, 16 can be accomplished directly as depicted in FIG. 3 or through intermediate heat transfer loops. Also various other known configurations of heat/mass exchange are possible, including rotating members and multiple cocurrent sorbers. Also the SCR 32 can be replaced/augmented by an externally cooled rectifier.

Referring to FIGS. 4–10, several variations of the FIGS. 1, 2, and 3 embodiment of the invention are depicted on thermodynamic diagrams. All of these variations share the characteristic feature of FIGS. 1, 2, and 3 that the vapor from the sub-ambient evaporator is absorbed by the sorbent in a 3P absorber and the super-dilute sorbent is partially desorbed at the delivery pressure through internal GAX heat exchange.

Figure 4:
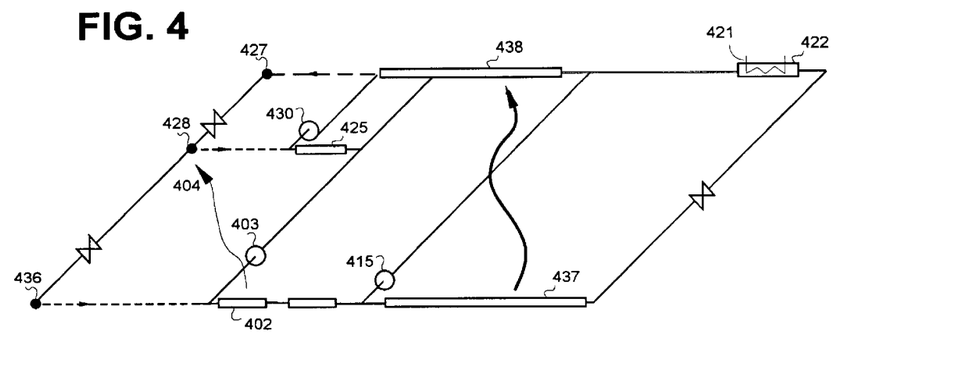
FIGS. 4–10 are the thermodynamic diagrams of several variants of the first embodiment.

FIG. 4 illustrates that the sub-ambient evaporator 428 and the suction pressure evaporator 436 can operate in series, the refrigerant from the condenser 427 first flows to 428 and the un-evaporated refrigerant then flows to 436. The GAX absorber 437 is in heat transfer relationship with the GAX desorber 438.

Figure 5:
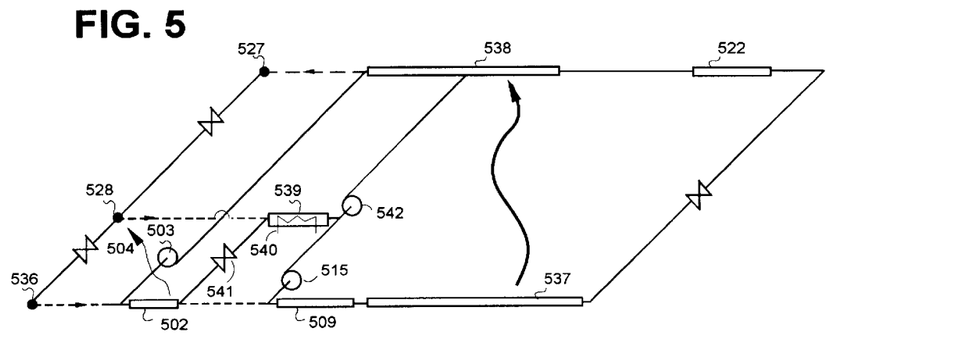

FIG. 5 illustrates an sorbent branch option: the sorbent from the externally cooled absorber 509 is pressurized via pump 515 and split into two streams—one stream flowing to a 3P absorber 539 externally cooled by means 540. The second stream is pressurized to the delivery pressure generator by pump 542. The effluent from the 3P absorber 539 is then let down in pressure via means 541 and flows to the sub-ambient absorber 502. The effluent from the sub-ambient absorber is then pressurized via means 503 to the delivery pressure.

Figure 6:
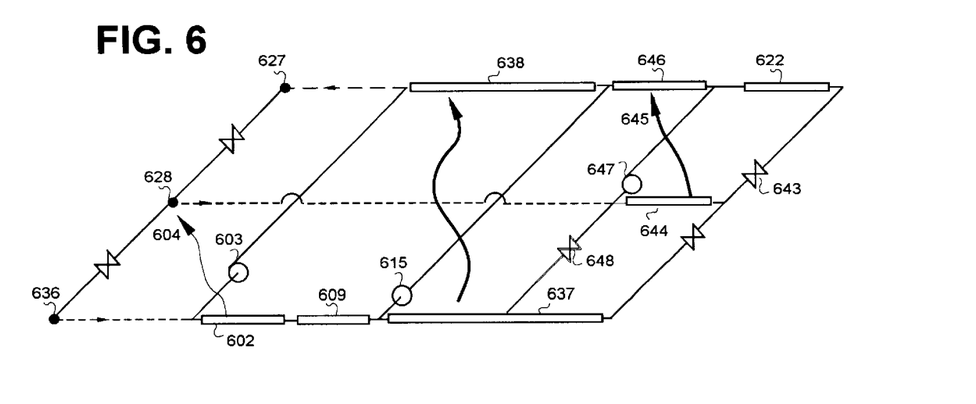

FIG. 6 illustrates another sorbent branching option: at least part of the sorbent from the generator 622 is letdown in pressure via means 643 to a 3P absorber 644 where it absorbs the vapor from the sub-ambient evaporator 628. The heat of absorption 645 is transferred to the delivery pressure generator 646. The effluent from the 3P absorber 644 is split into two streams—one stream is pressurized via means 647 to delivery pressure, the second stream is let down to suction pressure via means 648. The effluent from the sub-ambient absorber 602 is pressurized via means 603 to delivery pressure.

Figure 7:
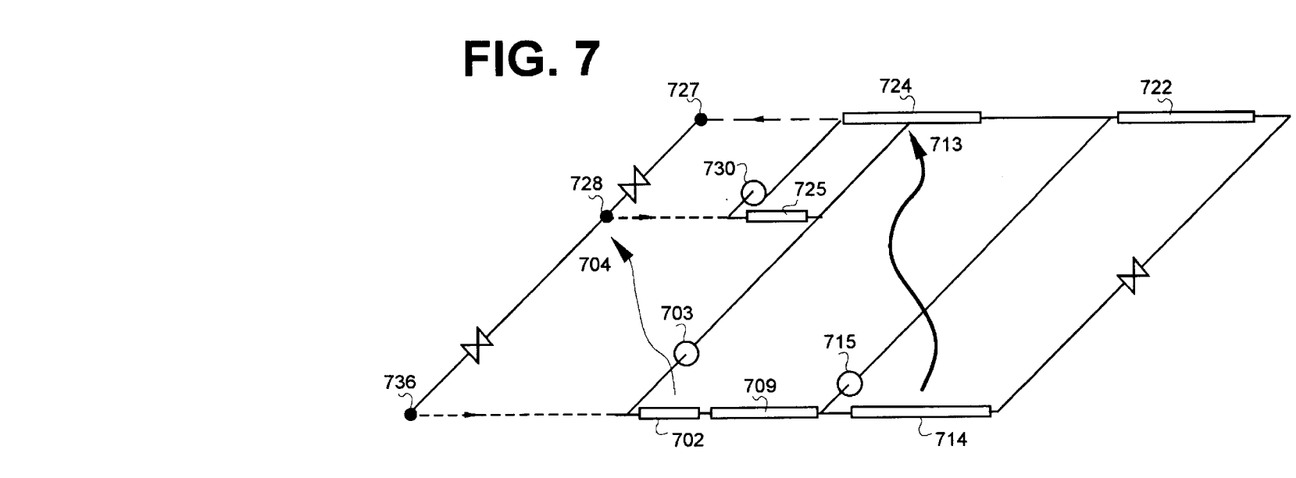

FIG. 7 illustrates the situation of ideal double effect lift, wherein there is no longer any GAX overlap in a conventional GAX cycle. With the illustrated SAA GAX cycle, about two-thirds of the absorber heat can still be used for GAX heating of generator 724 and only the remaining one-third of the absorber heat is rejected to external cooling. Part of the GAX heat is used to generate refrigerant for use in the sub-ambient evaporator 728 and the other part is used for generating product vapor.

Figure 8:
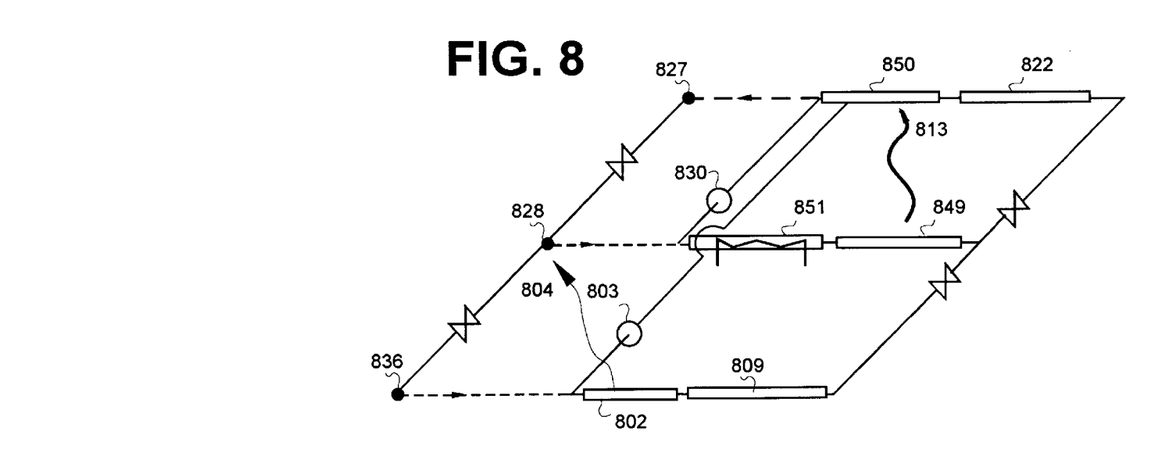

FIG. 8 illustrates the SAA GAX cycle in even higher lift situations, where GAX from suction pressure to delivery pressure is no longer possible. Even there, it is still possible to have GAX from 3P GAX absorber 849 to delivery pressure desorber 850. Also by supplying the super-diluted sorbent from the 3P externally cooled absorber 851 to the vapor exit end of desorber 850, eliminates or at least greatly diminishes the need for rectification of that vapor, and hence substantially increases cycle COP.

Figure 9:
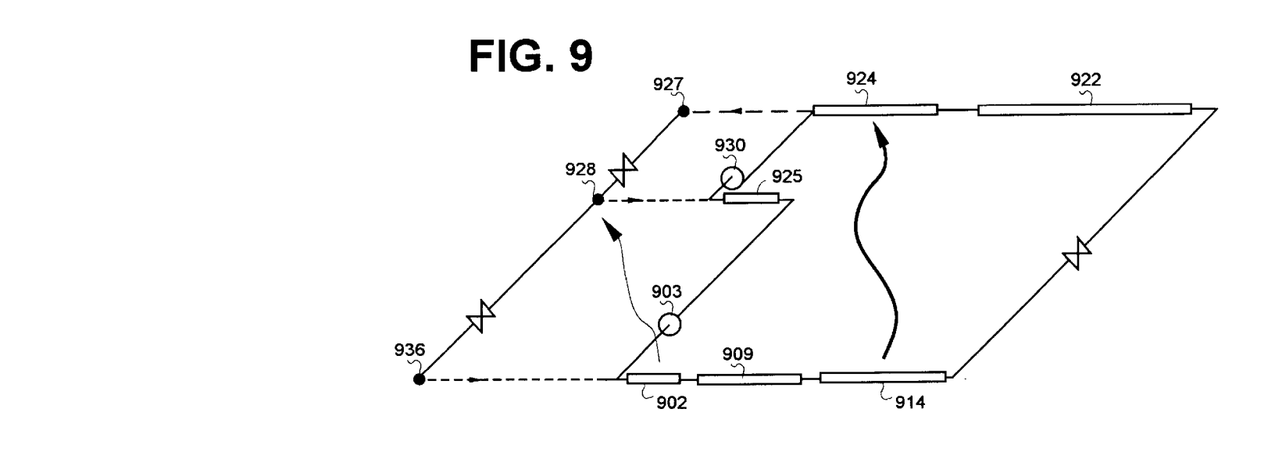
Figure 10:
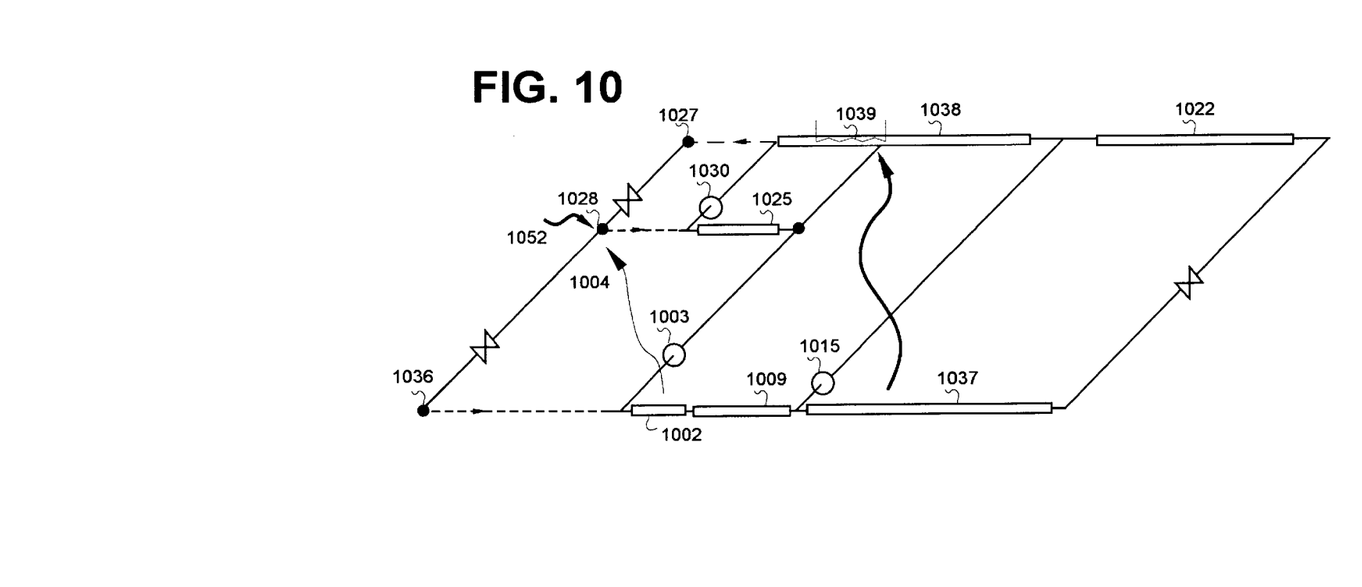

FIG. 9 illustrates cycle operation with just two pumps 903 and 930. The cycle offers the advantages of simplicity and the use of half-head pumps. FIG. 10 illustrates the possibility of providing additional evaporation 1052 at the intermediate temperature level through means of the sub-ambient evaporator 1028 and additional heat input through means of heat exchanger 1039. Evaporation 1052 can provide cooling or heat pumping at a temperature level different form temperature of evaporator 1036. Heat exchanger 1039 can use lower temperature heat than the generator 1022. Note that these features can also be incorporated in other variations of the cycle illustrated in FIGS. 1 to 9.

Note that FIGS. 5–10 illustrate the series flow of refrigerant through the sub-ambient evaporator and the suction pressure evaporator as shown in FIG. 4. These cycles can also be operated with parallel refrigerant flow through the two evaporators as illustrated in FIGS. 1,2, and 3.

Figure 11:
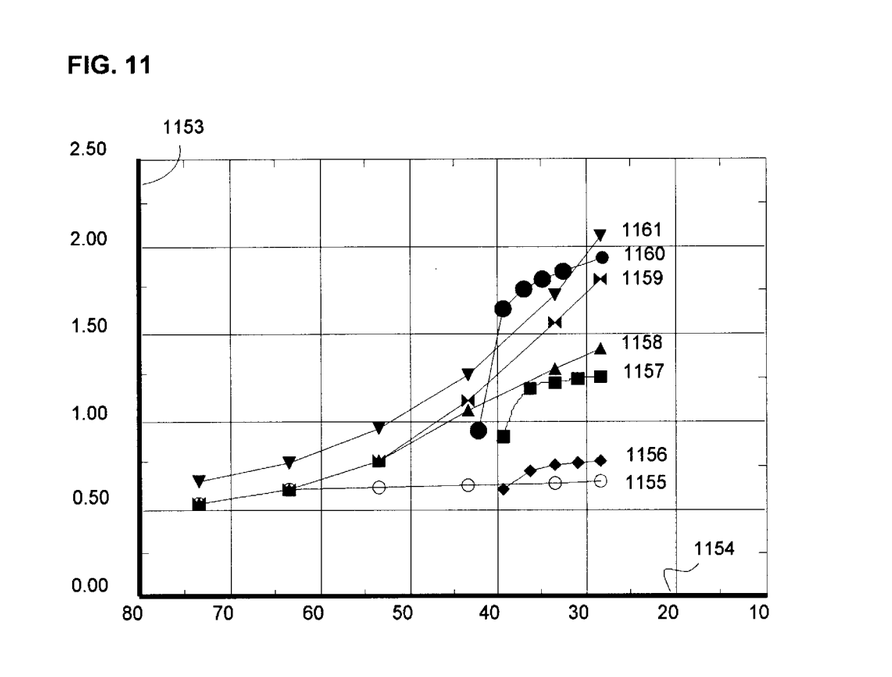
FIG. 11 illustrates the efficiency advantage of a new absorption cycle incorporating the disclosed invention, in comparison to known absorption cycles.

The efficiency or COP (Coefficient of Performance) advantages obtainable from proper incorporation of this sub-ambient absorber GAX apparatus in an absorption cycle are illustrated in FIG. 11. In that figure, the vertical axis 1153 is marked in units of COP, and the horizontal axis 1154 is marked in units of heat pump temperature lift (C). The several curves indicate the approximate cooling COP vs. cycle lift characteristics of various known absorption cycles, as follows: single-effect NH3-H2O (1155); single-effect LiBr-H2O (1156); double-effect LiBr-H2O (1157); GAX cycle (1158); branched GAX (1159); triple-effect (1160); and the NH3-H2O VX duplex GAX and SAA GAX(1161).

Thus it is seen that the SAA GAX cycle is comparable to or more efficient than any previously known absorption cycle at higher values of lift. Added to this advantage are: 1) it responds automatically to different lift conditions, thus taking full advantage of benign ambient periods; 2) the required equipment is relatively simple and low-cost. For example, extended GAX is achieved through simple absorption and evaporation, and the system, operating at conventional temperatures and pressures, could be built with mild steel and known corrosion inhibitors.

Figure 12:
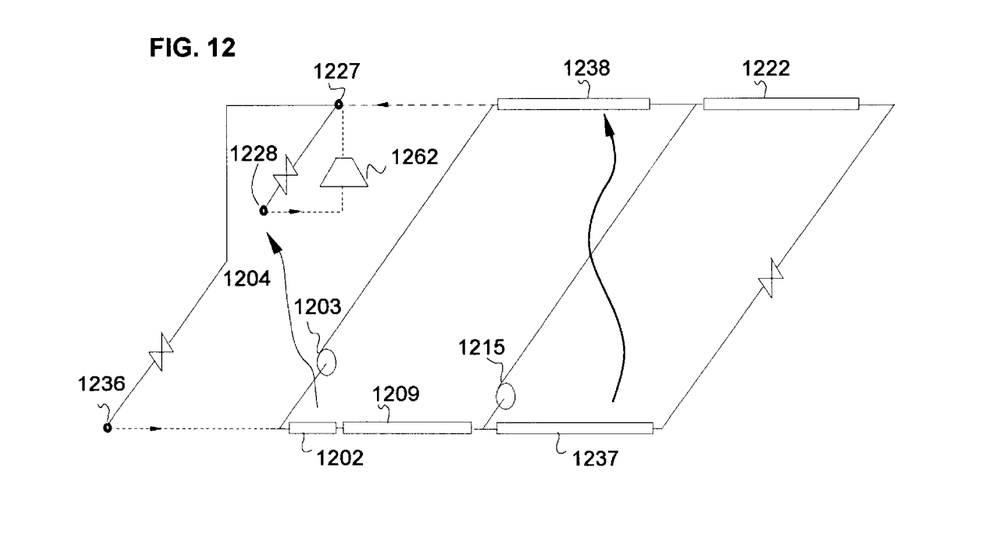
FIGS. 12 and 13 illustrate respectively the thermodynamic diagram and simplified flowsheet of a hybrid embodiment of this invention wherein the vapor from the sub-ambient evaporator is mechanically compressed to higher pressure.

There is one more embodiment of absorption cycle which incorporates SAA GAX, beyond that of FIGS. 1–10. The second embodiment depicted in FIGS. 12–15, is characterized by the mechanical compression of at least part of the vapor from the sub-ambient evaporator to higher pressure. Thus the cycle is a hybrid of mechanical compression cycle and absorption cycle. The compressor is operated when electric utility rates are favorable, to achieve higher capacity and performance, and lower operating cost. Referring to FIG. 12 the sub-ambient absorber 1202 is cooled by rejecting heat 1204 to the sub-ambient evaporator 1228. The super-dilute sorbent from sub-ambient absorber 1202 is pumped to the delivery pressure desorber 1238 by pump 1203. The vapor from the sub-ambient evaporator is mechanically compressed to delivery pressure by compressor 1262 and condensed in condenser 1227.

Figure 13:
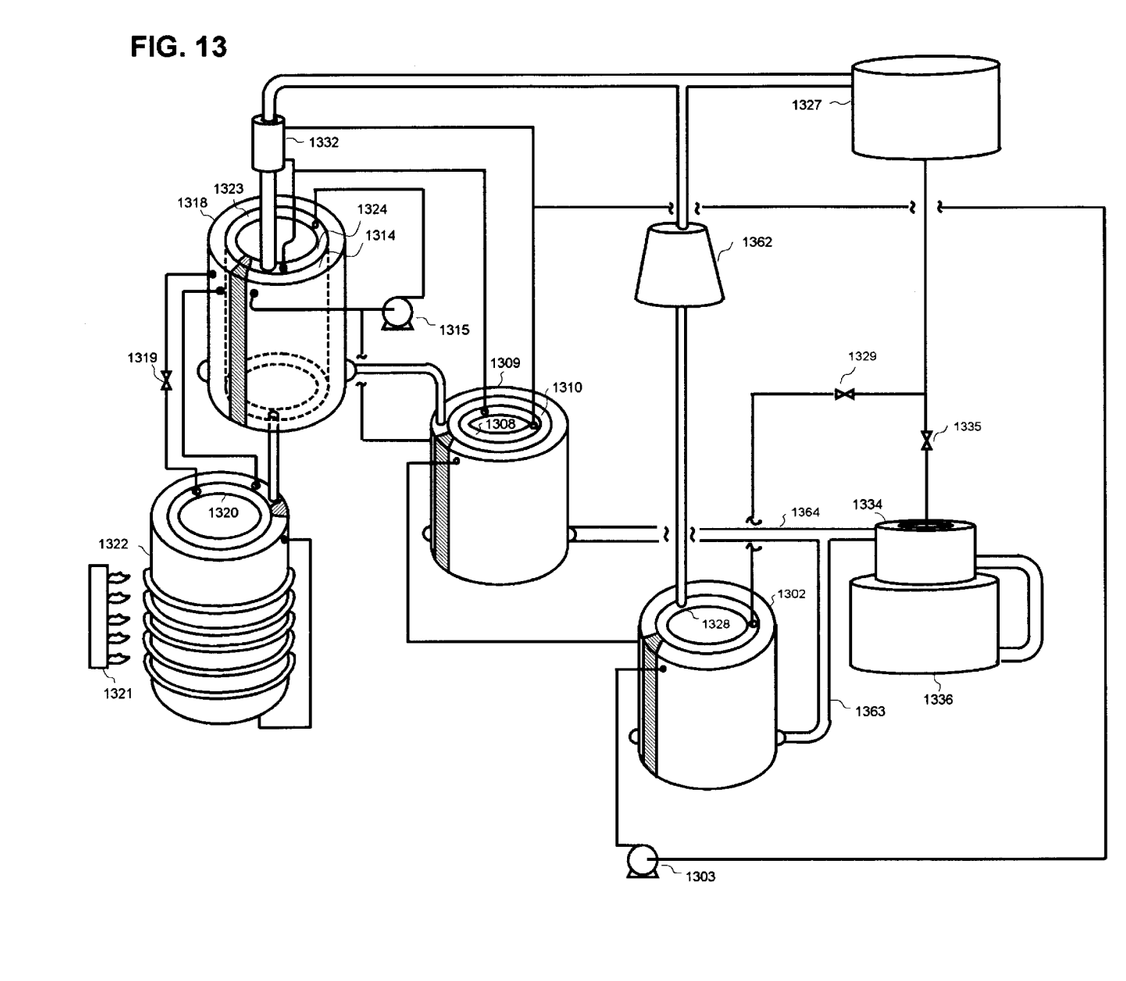

Referring to FIG. 13, the same hybrid cycle is depicted as appears in FIG. 12, in simplified schematic flowsheet form. Like numbered components have the same description as in FIG. 12. The heat and mass transfer components 1202, 1228, 1209, 1214, 1218, 1223, 1224, and 1222 are depicted as multiple cocurrent pressure equalized upflow sorbers. The vapor from the RHX (1234) is split into two streams to minimize pressure drop; conduit 1263 supplies vapor to the sub-ambient absorber 1202 and conduit 1264 supplies vapor to externally cooled absorber 1209. In comparing the multiple cocurrent sorbers depicted in FIG. 13 to the counter current flowsheet of FIG. 2, the former has the advantages of simplicity of construction especially for large capacity, and attractive economics, with only a small penalty on performance.

Figure 14:
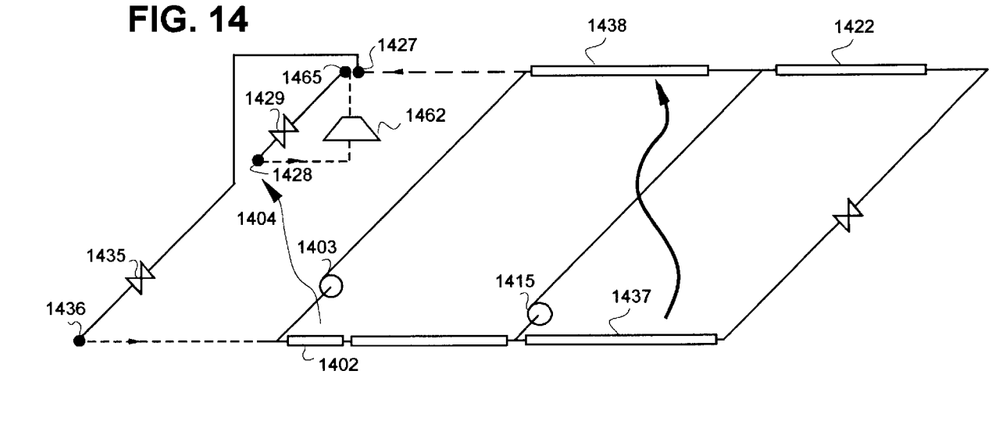
FIGS. 14 and 15 are the thermodynamic diagrams of two variants of the hybrid embodiment.
Figure 15:
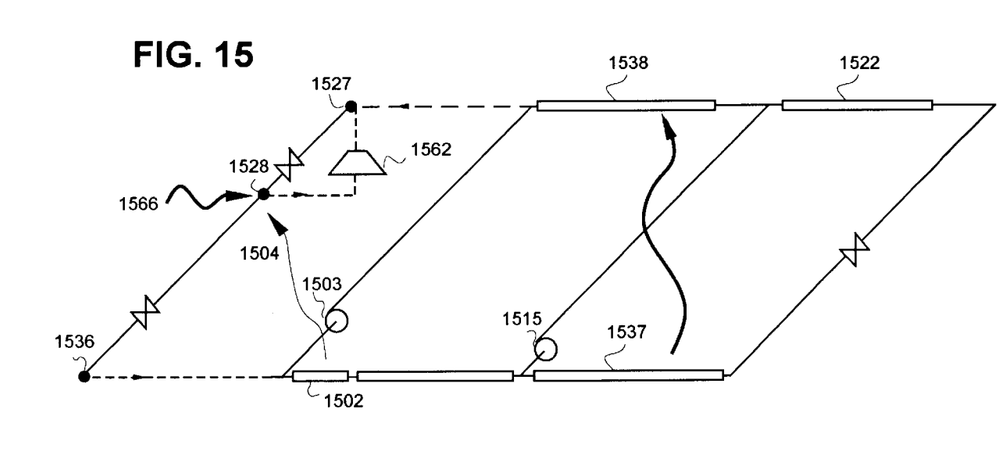

Several variations of the hybrid cycle are illustrated in FIGS. 14 to 15. FIG. 14 illustrates the embodiment having an independent refrigerant loop comprising of the sub-ambient evaporator 1428, the compressor 1462, and a separate condenser 1465 facilitating the use of conventional oil-based compressors and/or alternative refrigerants. Note that with an alternative refrigerant in the independent loop, the pressures in the two condensers 1427 and 1465 could be different. FIG. 15 illustrates the embodiment in which additional evaporation 1566 is provided at the intermediate temperature level through means of the sub-ambient evaporator 1528. This feature can be included in any of the other cycles illustrated. The evaporators 1528 and 1536 are shown operating in series in FIG. 15. The same cycle can be operated with the two evaporators in parallel as shown in FIG. 12.

I claim:

1. Apparatus for heat-activated cooling comprising:
    a) a first evaporator which produces said cooling;
    b) at least two absorbers for vapor from said evaporator, one of said absorbers cooled by a second evaporator, and the other by a generator;
    c) an externally-heated generator;
    d) a condenser which receives vapor from said absorber-heated generator and from said externally-heated generator; and
    e) a pump which circulates absorbent solution sequentially through said absorbers and said generators.

2. Apparatus according to claim 1 additionally comprised of a rectifier which rectifies vapor enroute from said generators to said condenser.

3. Apparatus according to claim one additionally comprised of an intermediate pressure absorber which receives vapor from said second evaporator and which is cooled by external cooling.

4. The apparatus according to claim 1 additionally comprised of a third absorber which receives vapor from said first evaporator and which is cooled by external cooling.

5. The apparatus according to claim 4 additionally comprised of a mechanical compressor which compresses the vapor from said second evaporator and discharges it to said condenser.

6. The apparatus according to claim 4 additionally comprised of a mechanical compressor which compresses the vapor from said second evaporator and discharges it to a second condenser which is hermetically separate from said condenser.

7. Apparatus according to claim 1 additionally comprised of an intermediate pressure absorber which receives vapor from said second evaporator and which is cooled by a generator.

8. Apparatus for heat-activated compression of a refrigerant vapor comprising:
  a) a first absorber of said vapor, which is cooled by an evaporator;
  b) a second absorber of said vapor, which is cooled by ambient cooling;
  c) a third absorber of said vapor, which is cooled by heat exchange with a first generator;
  d) a second generator which is externally heated; and
  e) at least one pump which circulates absorbent solution from said absorbers to said generators.

9. A process for producing cold from heat comprising:
  a) evaporating a first refrigerant to produce said cold;
  b) absorbing said evaporated first refrigerant into a first, second, and third absorber;
  c) cooling said first absorber below ambient temperature by evaporating a hermetically separate second refrigerant in thermal contact therewith;
  d) cooling said second absorber by ambient cooling; and
  e) cooling said third absorber by exchanging heat with a first generator.

10. Process according to claim 5 additionally comprising mechanically compressing said evaporated second refrigerant.

11. A process for producing cold from heat comprising:
  a) evaporating a refrigerant at a first pressure to produce said cold;
  b) absorbing said evaporated refrigerant into a first, second, and third absorber;
  c) cooling said first absorber below ambient temperature by evaporating said refrigerant at a second pressure in thermal contact with said first absorber;
  d) cooling said second absorber by ambient cooling; and
  e) cooling said third absorber by exchanging heat with a first generator.

* * * * *